(12) United States Patent
Zheng et al.

(10) Patent No.: US 8,767,854 B2
(45) Date of Patent: Jul. 1, 2014

(54) MODULATION CODE SET (MCS) AND LDPC (LOW DENSITY PARITY CHECK) CODING WITHIN MULTIPLE USER, MULTIPLE ACCESS, AND/OR MIMO WIRELESS COMMUNICATIONS

(75) Inventors: Jun Zheng, San Diego, CA (US); Vinko Erceg, Cardiff by the Sea, CA (US); Andrew J. Blanksby, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 290 days.

(21) Appl. No.: 13/221,017

(22) Filed: Aug. 30, 2011

(65) Prior Publication Data

US 2012/0269294 A1 Oct. 25, 2012

Related U.S. Application Data

(60) Provisional application No. 61/477,010, filed on Apr. 19, 2011.

(51) Int. Cl.
*H04L 5/12* (2006.01)
*H04L 23/02* (2006.01)

(52) U.S. Cl.
USPC ............ 375/261; 375/267; 370/203; 370/208

(58) Field of Classification Search
USPC .......... 375/260–261, 267, 299; 714/800–804; 708/530–531; 370/203–211
See application file for complete search history.

(56) References Cited

U.S. PATENT DOCUMENTS

| | | | |
|---|---|---|---|
| 7,181,677 B1 * | 2/2007 | Weng | 714/784 |
| 2006/0092902 A1 * | 5/2006 | Schmidt | 370/342 |
| 2010/0269010 A1 * | 10/2010 | Xu et al. | 714/752 |
| 2012/0063429 A1 * | 3/2012 | Yang et al. | 370/338 |

* cited by examiner

*Primary Examiner* — Curtis Odom
(74) *Attorney, Agent, or Firm* — Garlick & Markison; Shayne X. Short

(57) ABSTRACT

Modulation code set (MCS) and LDPC (Low Density Parity Check) coding within multiple user, multiple access, and/or MIMO wireless communications. Selective operation in accordance with different operational modes is performed. Operation within a first mode may correspond to that which is in full compliance with a given protocol, standard, and/or recommended practice, while operation within a second mode may correspond to that which provides additional/augmented capability and/or functionality with respect to that protocol, standard, and/or recommended practice. Operational modes selectivity may be made between proprietary and non-proprietary modes of operation. All available modulation coding sets (MCSs) may be in employed by providing such multi-mode operation. When operating within one of the operational modes (e.g., proprietary), a signal is generated to include an integer number of data bits per orthogonal frequency division multiplexing (OFDM) symbol using any desired operation (e.g., floor, ceiling, rounding, etc.).

20 Claims, 21 Drawing Sheets

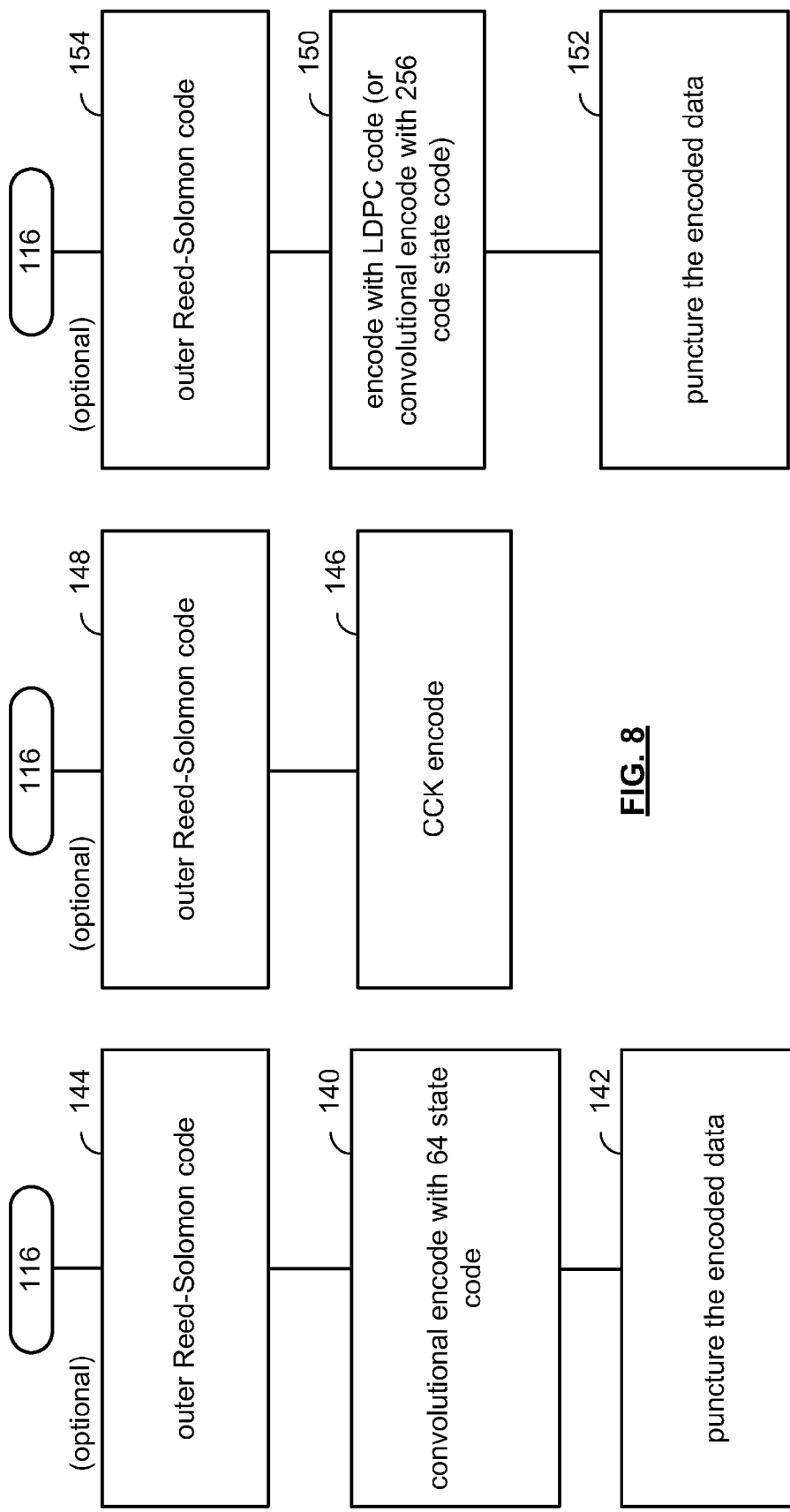

1400

| bw | $N_{ss}$ | mcs | modulation | coding rate | PHY rate (800 ns GI) | PHY rate (400 ns GI) | $N_{ES}$ |
|----|----|----|----|----|----|----|----|
| 20 | 1 | 9 | 256 QAM | 5/6 | 86.7 Mbps | 96.3 Mbps | 1 |
| 20 | 2 | 9 | 256 QAM | 5/6 | 173.3 Mbps | 192.6 Mbps | 1 |
| 20 | 4 | 9 | 256 QAM | 5/6 | 346.7 Mbps | 385.2 Mbps | 1 |
| 20 | 5 | 9 | 256 QAM | 5/6 | 433.3 Mbps | 481.5 Mbps | 1 |
| 20 | 7 | 9 | 256 QAM | 5/6 | 606.7 Mbps | 674.1 Mbps | 2 |
| 20 | 8 | 9 | 256 QAM | 5/6 | 693.3 Mbps | 770.4 Mbps | 2 |

• 20 MHz

| bw | $N_{ss}$ | mcs | modulation | coding rate | PHY rate (800 ns GI) | PHY rate (400 ns GI) | $N_{ES}$ |
|---|---|---|---|---|---|---|---|
| 80 | 3 | 6 | 64 QAM | 3/4 | 789.8 Mbps | 877.5 Mbps | 2 |
| 80 | 6 | 9 | 256 QAM | 5/6 | 2340 Mbps | 2600 Mbps | 5 |
| 80 | 7 | 2 | QPSK | 3/4 | 614.3 Mbps | 682.5 Mbps | 2 |
| 80 | 7 | 6 | 64 QAM | 3/4 | 1842.8 Mbps | 2047.5 Mbps | 4 |
| 80 | 7 | 7 | 64 QAM | 5/6 | 2047.5 Mbps | 2275 Mbps | 4 |
| 80 | 7 | 8 | 256 QAM | 3/4 | 2457 Mbps | 2730 Mbps | 5 |
| 80 | 8 | 7 | 64 QAM | 5/6 | 2340 Mbps | 2600 Mbps | 5 |

• 80 MHz

| bw | $N_{ss}$ | mcs | modulation | coding rate | PHY rate (800 ns GI) | PHY rate (400 ns GI) | $N_{ES}$ |
|---|---|---|---|---|---|---|---|
| 160 | 3 | 9 | 256 QAM | 5/6 | 2340 Mbps | 2600 Mbps | 5 |
| 160 | 4 | 7 | 64 QAM | 5/6 | 2340 Mbps | 2600 Mbps | 5 |
| 160 | 5 | 8 | 256 QAM | 3/4 | 3510 Mbps | 3900 Mbps | 7 |
| 160 | 6 | 7 | 64 QAM | 5/6 | 3510 Mbps | 3900 Mbps | 7 |
| 160 | 7 | 4 | 16 QAM | 3/4 | 2457 Mbps | 2730 Mbps | 5 |
| 160 | 7 | 7 | 64 QAM | 5/6 | 4095 Mbps | 4550 Mbps | 8 |
| 160 | 7 | 8 | 256 QAM | 3/4 | 4914 Mbps | 5460 Mbps | 10 |
| 160 | 7 | 9 | 256 QAM | 5/6 | 5460 Mbps | 6067 Mbps | 11 |
| 160 | 8 | 5 | 64 QAM | 2/3 | 3744 Mbps | 4160 Mbps | 7 |
| 160 | 8 | 8 | 256 QAM | 3/4 | 5616 Mbps | 6240 Mbps | 11 |

• 160 MHz

| bw | $N_{ss}$ | mcs | modulation | coding rate | PHY rate (800 ns GI) | PHY rate (400 ns GI) | $N_{ES}$ |
|---|---|---|---|---|---|---|---|
| 20 | 1 | 9 | 256 QAM | 5/6 | 86.7 Mbps | 96.3 Mbps | 1 |
| 20 | 2 | 9 | 256 QAM | 5/6 | 173.3 Mbps | 192.6 Mbps | 1 |
| 160 | 3 | 9 | 256 QAM | 5/6 | 2340 Mbps | 2600 Mbps | 5 |

• 20 MHz, 160 MHz

| bw | $N_{ss}$ | mcs | modulation | coding rate | PHY rate (800 ns GI) | PHY rate (400 ns GI) | $N_{ES}$ |
|---|---|---|---|---|---|---|---|
| 80 | 3 | 6 | 64 QAM | 3/4 | 789.8 Mbps | 877.5 Mbps | 2 |

- 80 MHz

FIG. 18

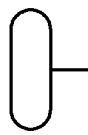

FIG. 20A

2000 generating a signal including an integer number of data bits per OFDM symbol based on a product term function corresponding to a number of coded bits per OFDM symbol multiplied by code rate (e.g., floor, ceiling, rounding, etc.) 2010 transmitting the signal to at least one additional communication device (e.g., via at least one communication channel using at least one antenna) 2020

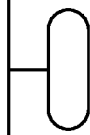

FIG. 20B

2001 performing BCC encoding of at least one information bit thereby generating a signal including an integer number of data bits per OFDM symbol based on a product term function corresponding to a number of coded bits per OFDM symbol multiplied by code rate (e.g., floor, ceiling, rounding, etc.) 2011 transmitting the signal to at least one additional communication device (e.g., via at least one communication channel using at least one antenna) 2021

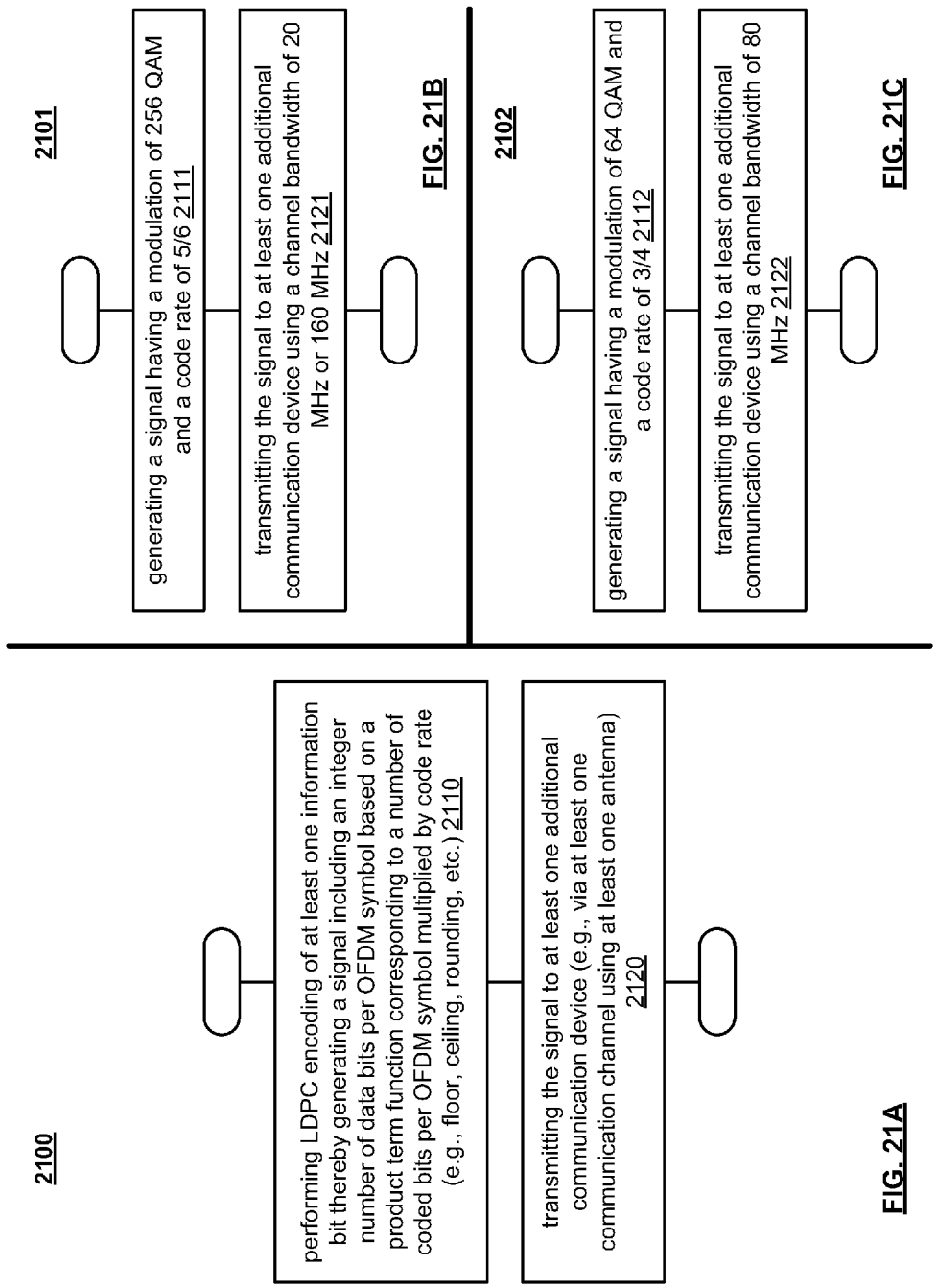

MODULATION CODE SET (MCS) AND LDPC (LOW DENSITY PARITY CHECK) CODING WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/477,010, entitled "Modulation code set (MCS) and LDPC (Low Density Parity Check) coding within multiple user, multiple access, and/or MIMO wireless communications," filed Apr. 19, 2011.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 pages.

3. IEEE P802.11ac™/D1.1, August 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 297 total pages (pp. i-xxiii, 1-274).

BACKGROUND OF THE INVENTION

1. Technical Field of the Invention

The invention relates generally to communication systems; and, more particularly, it relates to adapting and extending modulation coding sets (MCSs) for use in communications between communication devices within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 14 illustrates an embodiment of modulation coding set (MCS) tables for binary convolutional code (BCC) for 20 MHz operation.

FIG. 15 illustrates an embodiment of MCS tables for BCC for 80 MHz operation.

FIG. 16 illustrates an embodiment of MCS tables for BCC for 160 MHz operation.

FIG. 17 illustrates an embodiment of MCS rates corresponding to peak PHY rate for 20 MHz and 160 MHz operation.

FIG. 18 illustrates an embodiment of an MCS suitable to improved link adaptation.

FIG. 20A, FIG. 20B, FIG. 21A, FIG. 21B, and FIG. 21C illustrate various embodiments of methods for operating a communication device.

DETAILED DESCRIPTION OF THE INVENTION

Figure 1:
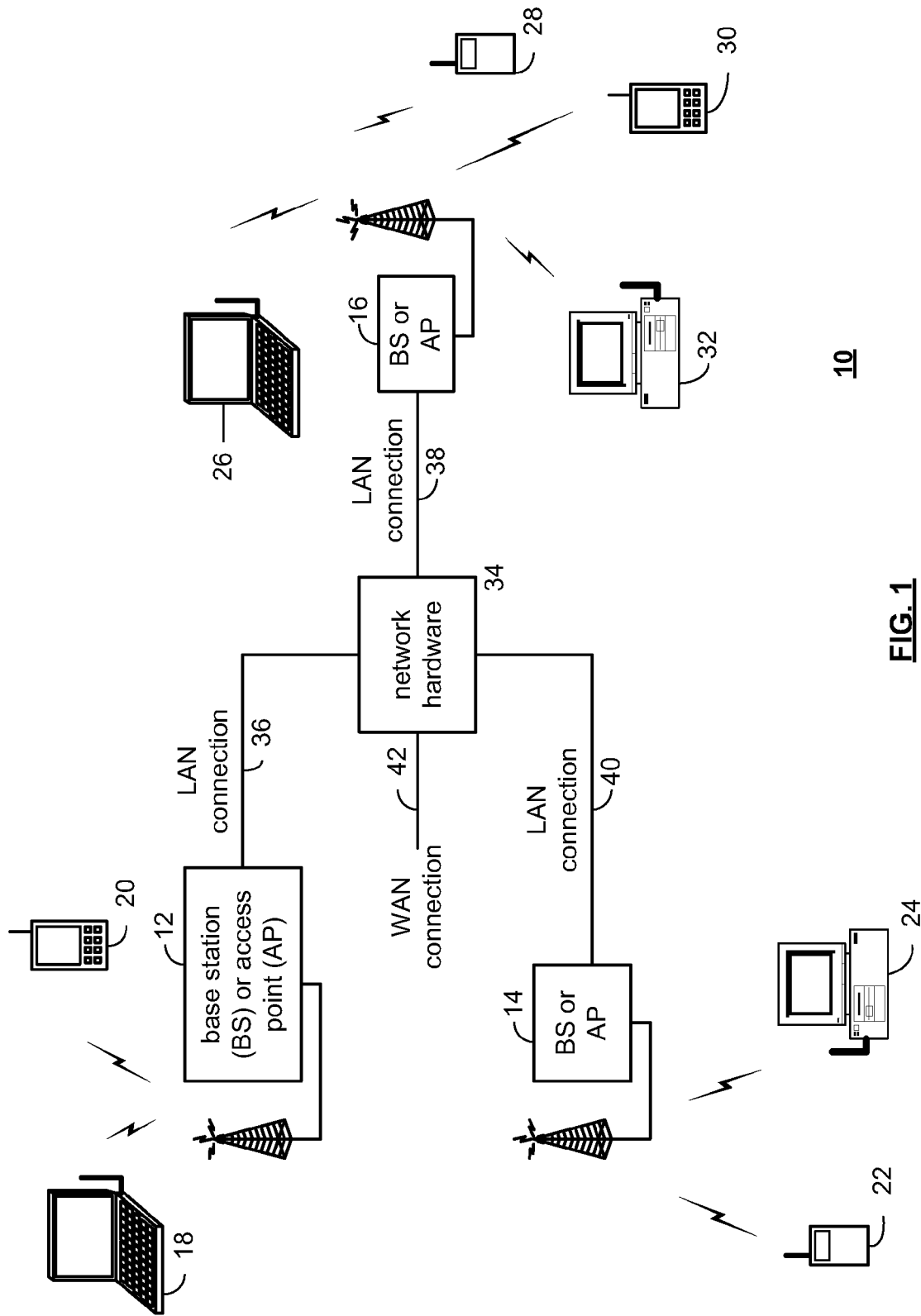
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
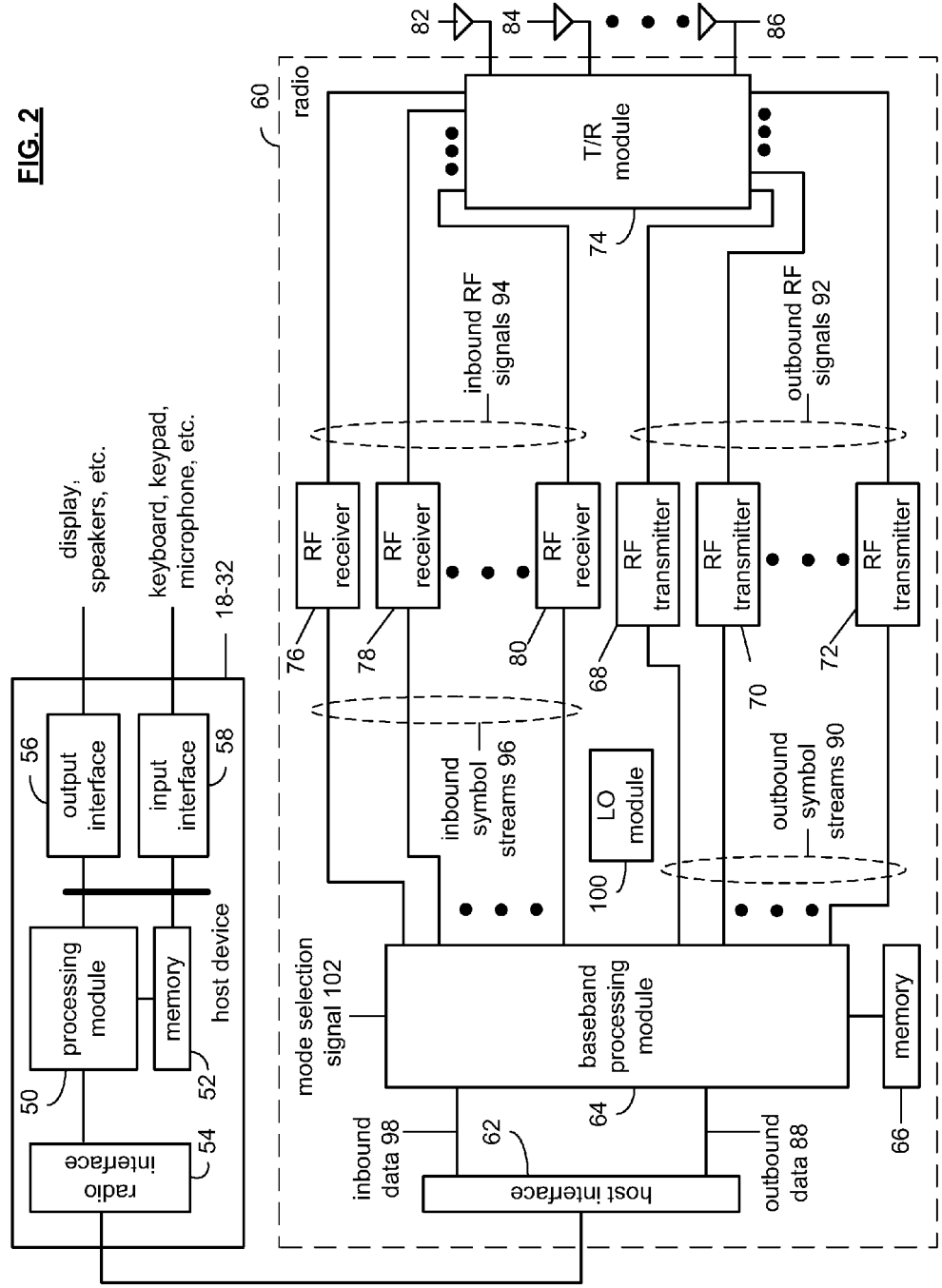
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
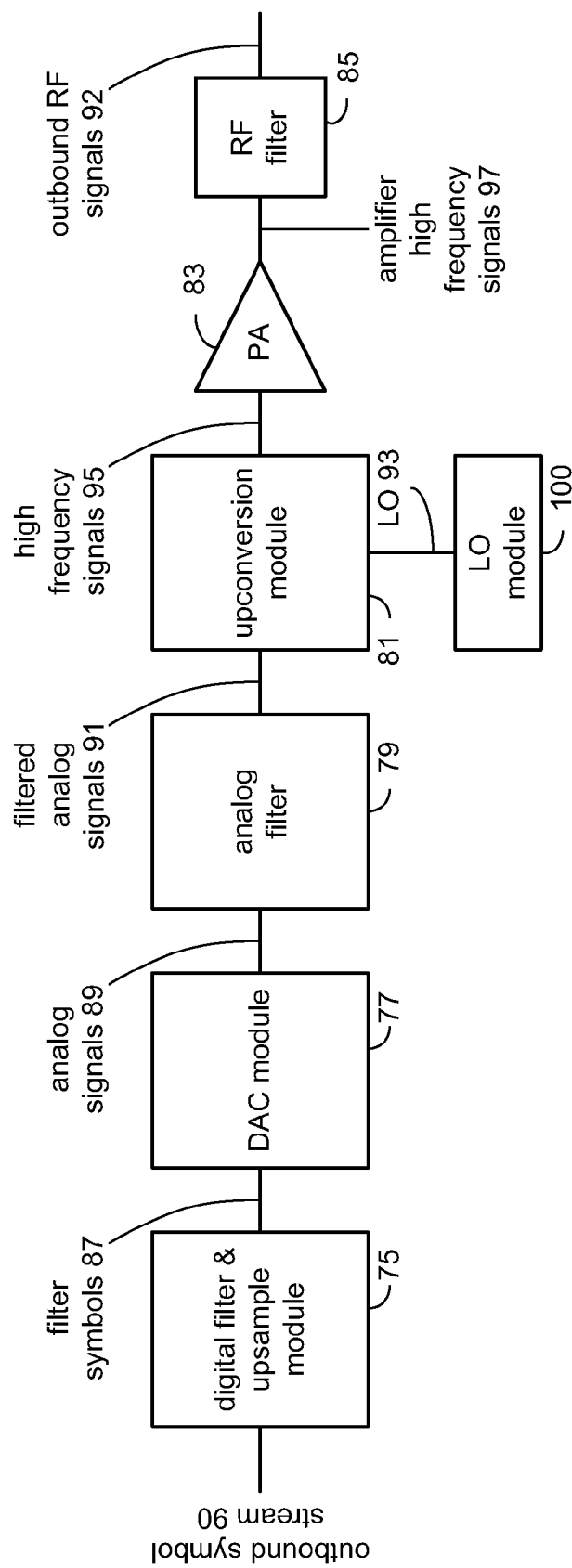
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
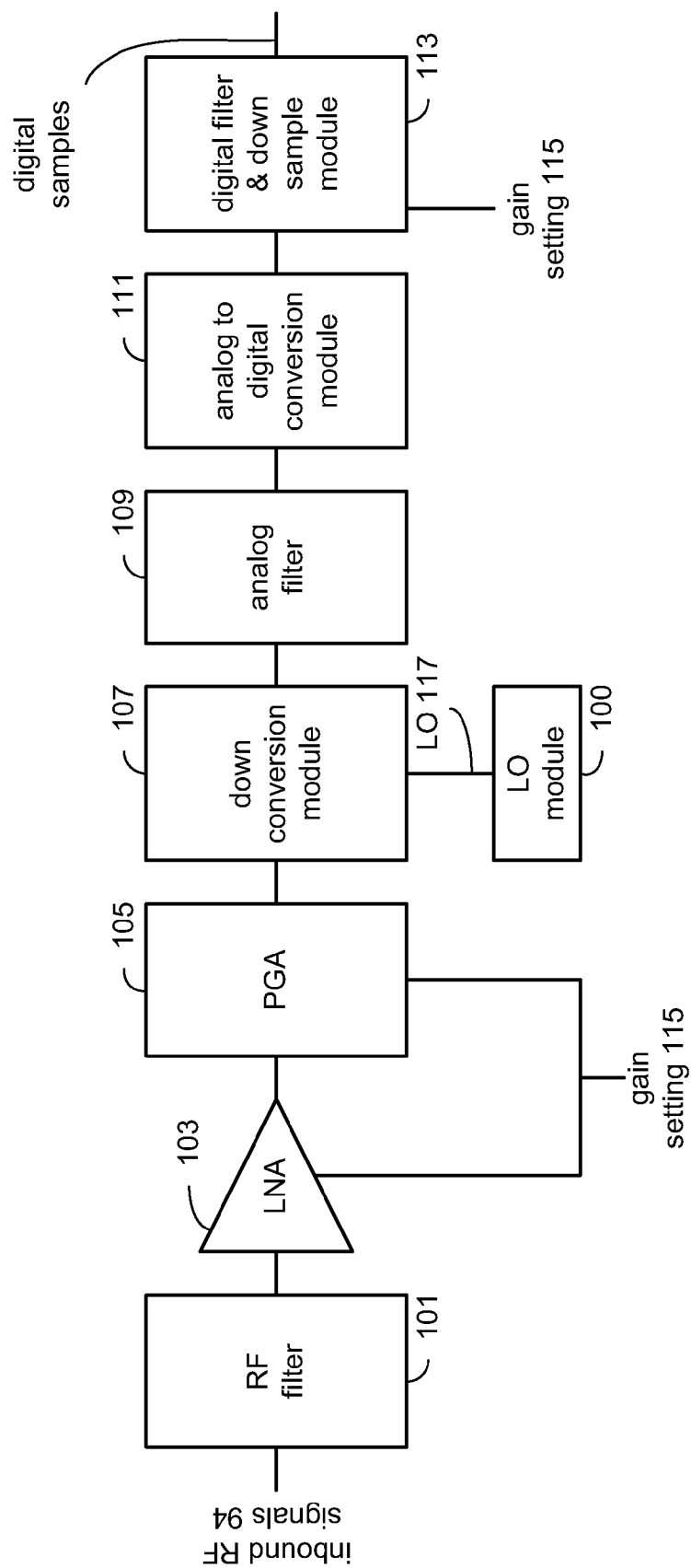
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
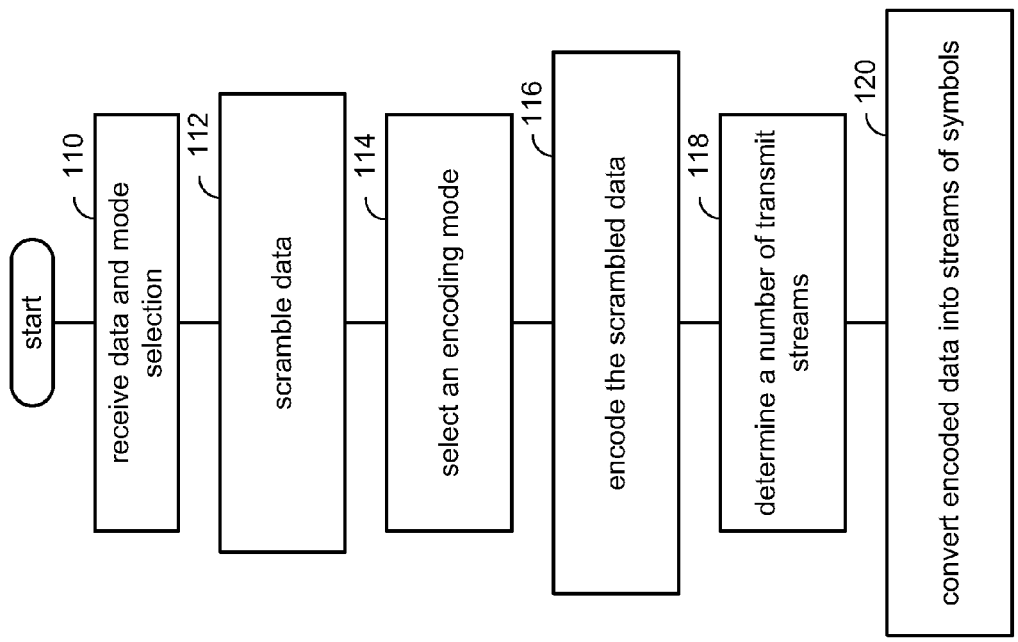
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
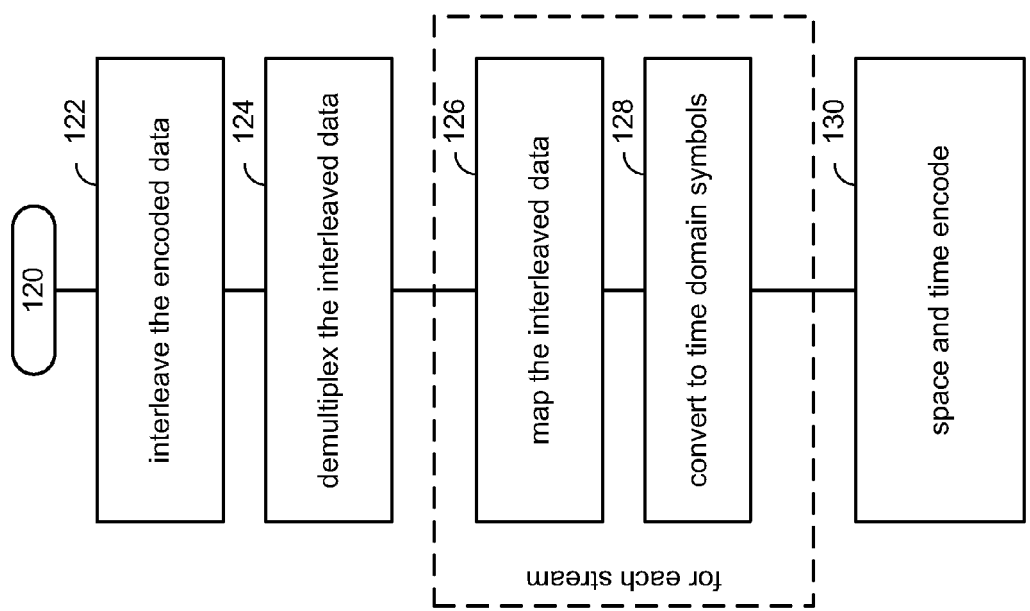
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
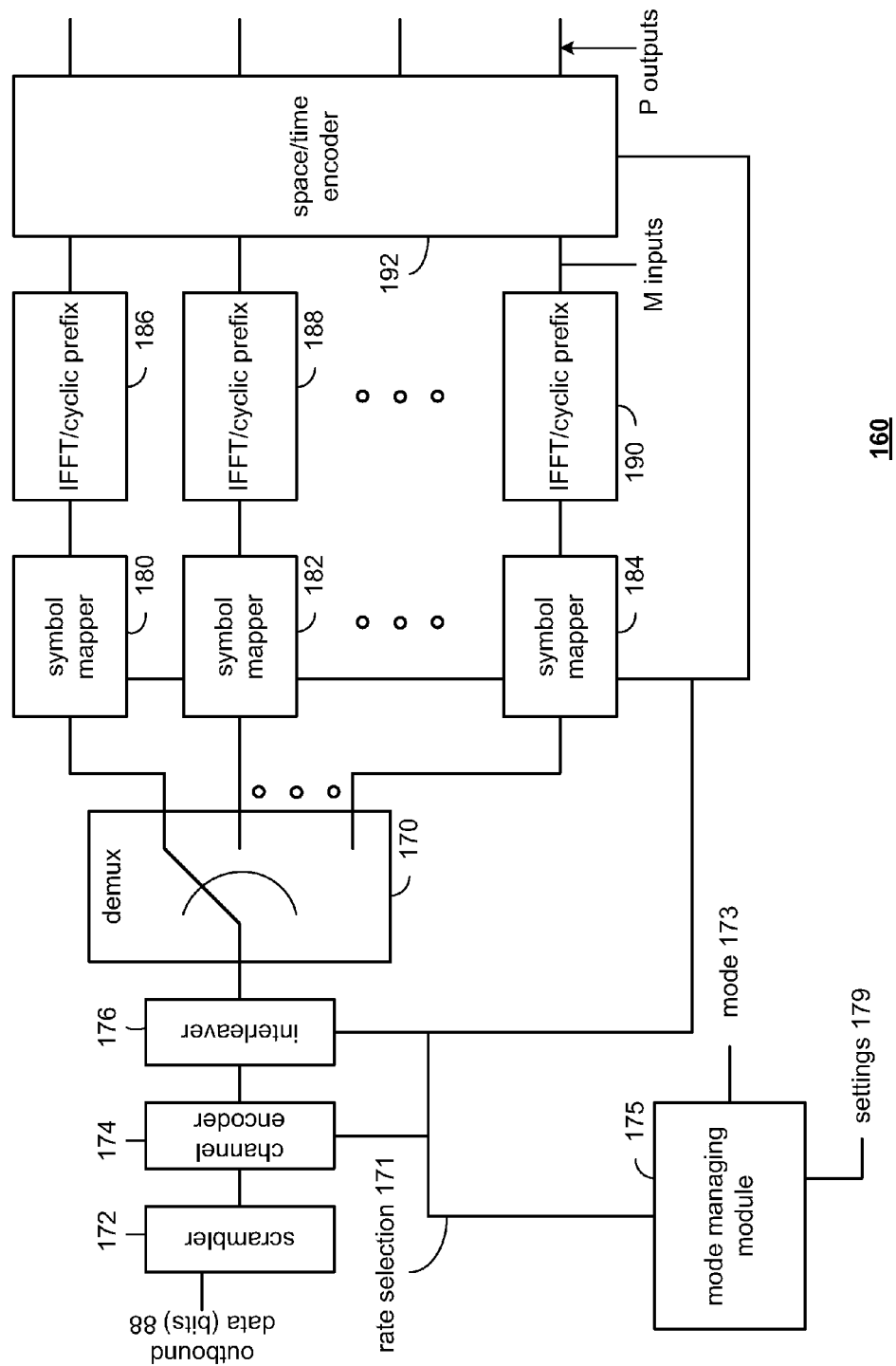
FIGS. 10A and 10B are diagrams illustrating embodiments of a radio transmitter.
Figure 10B:
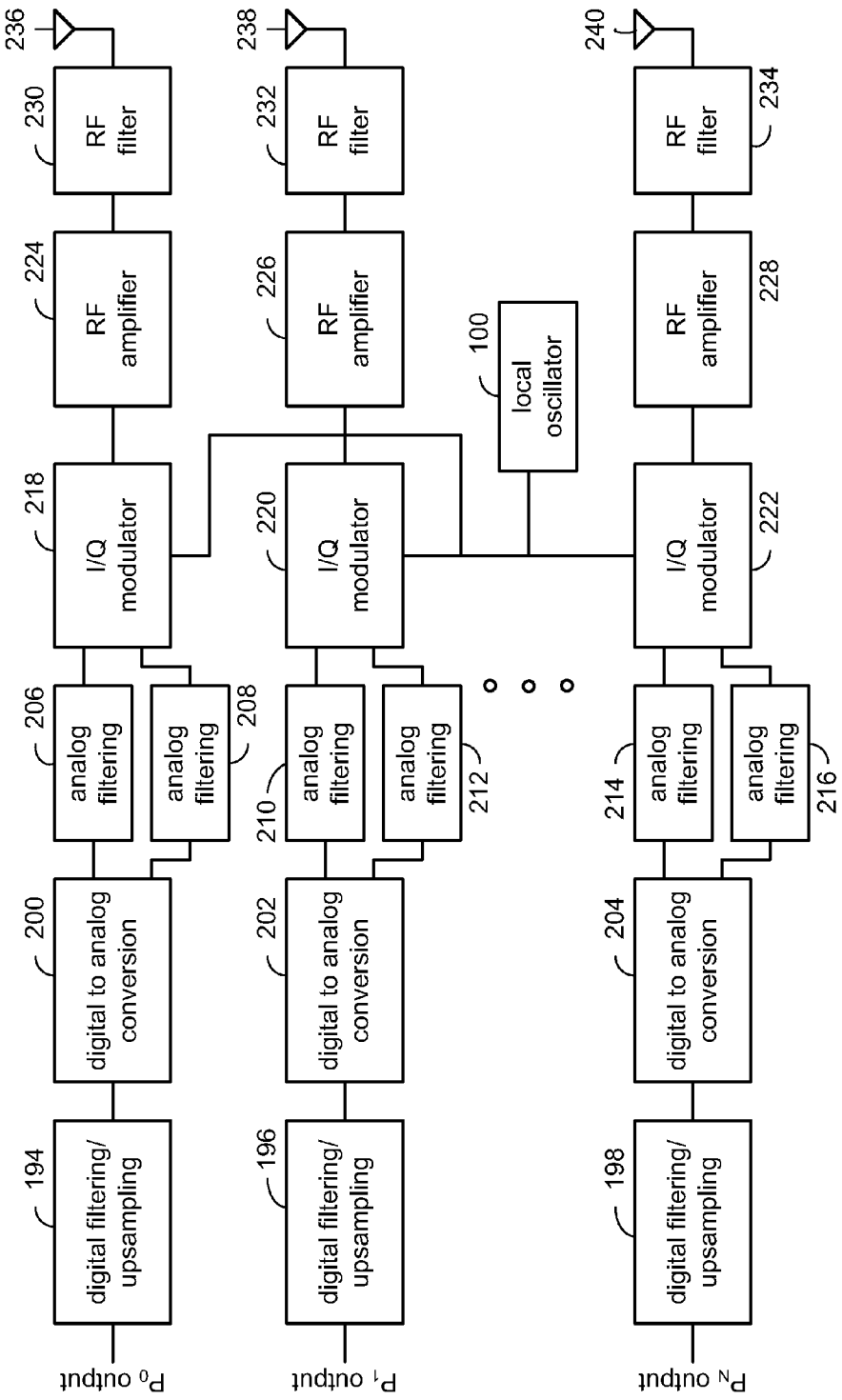

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of ½, ⅔, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-convert the I/Q signals into radio frequency signals.

The RF amplifiers 224-228 amplify the RF signals which are then subsequently filtered via RF filters 230-234 before being transmitted via antennae 236-240.

Figure 11A:
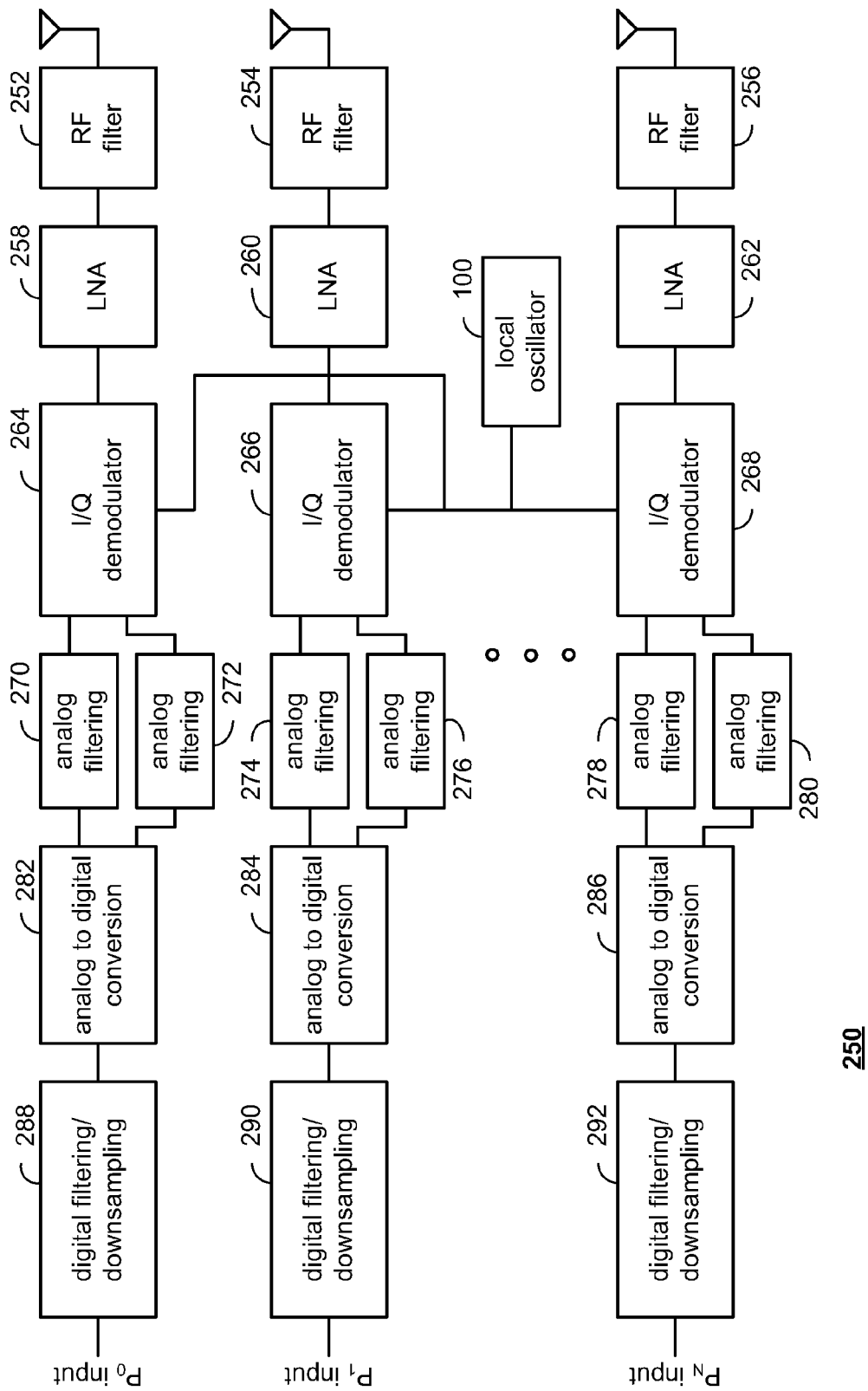
FIGS. 11A and 11B are diagrams illustrating embodiments of a radio receiver.
Figure 11B:
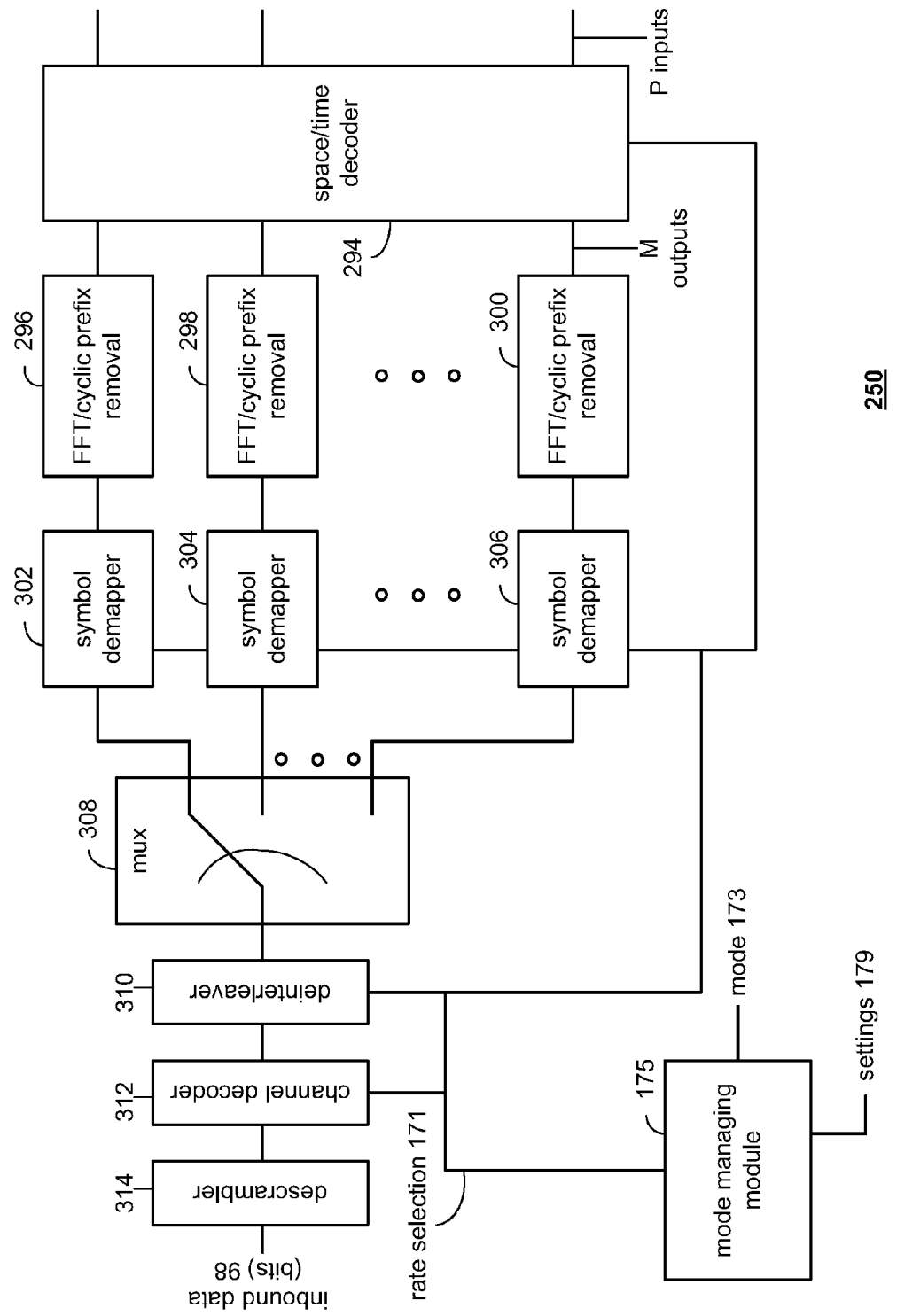

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal.

The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
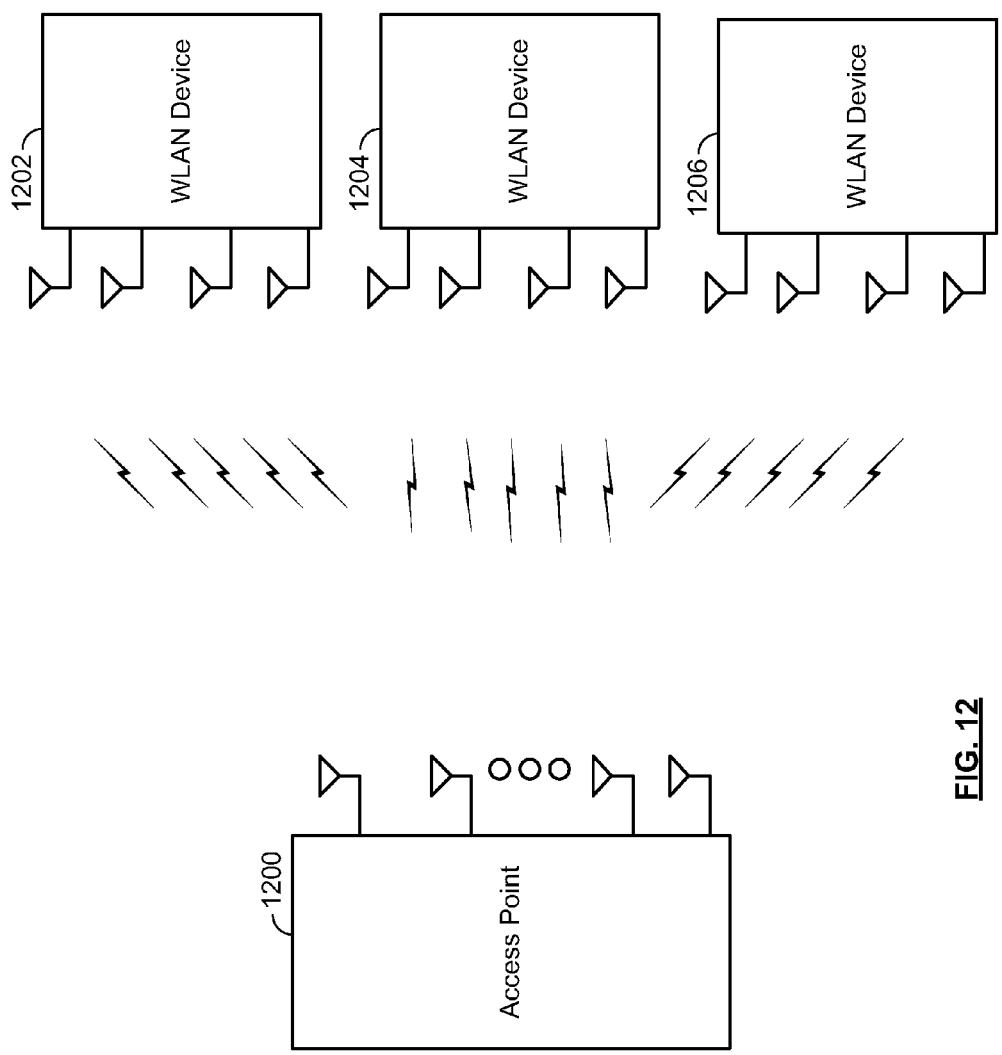
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Figure 13:
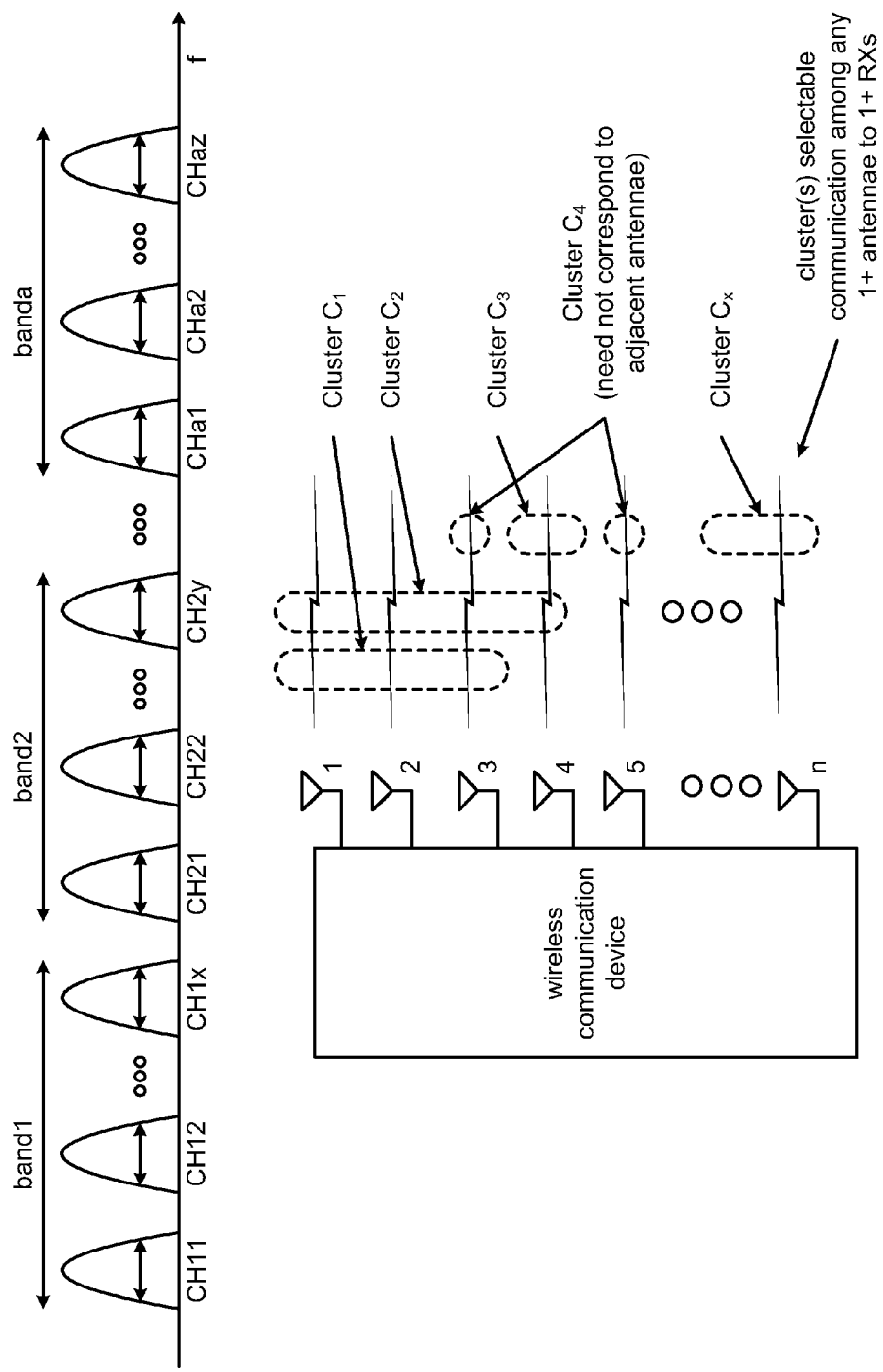
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an orthogonal frequency division multiplexing (OFDM) symbol, within or among one or more channels (e.g., sub-divided portions of the spectrum) that may be situated in one or more bands (e.g., portions of the spectrum separated by relatively larger amounts). For example, the various OFDM tones may be distributed among one or more clusters. As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. For example, different bands may respectively have different numbers of channel(s). Again, a cluster may generally be understood as any combination one or more channels among one or more bands. That is to say, a cluster may be viewed as being a function as follows: cluster =fnc(1+CHs, 1+bands, or any combination thereof) [e.g, cluster1(CH11, CH12, CH1x), cluster2(CH11, CHa1), cluster3(CH11, CH12, CH2x, CHax), etc.]. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae. In some embodiments, a primary cluster (e.g., Cluster $C_1$) is employed in all transmissions. That is to say, in such embodiments, any transmission from any wireless communication device will always use, at least, a primary cluster. Of course, other cluster may be combined and used along with the primary cluster in such optional embodiments.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. Generally speaking, wireless communication devices that are APs may be referred to as transmitting wireless communication devices, and wireless communication devices that are STAs may be referred to as receiving wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications.

Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, etc.).

Herein, certain modulation coding set (MCS) rates are added to a set of those MCSs that may be employed to effectuate communications in accordance with various standards, protocols, and/or recommended practices (e.g., and particularly in accordance with IEEE 802.11 ac in one embodiment).

By adding such particular MCS rates as described herein, the peak PHY rate provided by 256 QAM modulation is ensured. Also, by adding such particular MCS rates as described herein, certain MCS rates that are particularly suitable for link adaptation are also included thereby ensuring improved performance thereof.

In accordance with various aspects and principles, and their equivalents, of the invention, support is provided for all MCS rates for LDPC (Low Density Parity Check) coding, and a novel and efficient means for calculating and determining the number of data bits employed per OFDM symbol is presented. In accordance with various aspects and principles, and their equivalents, of the invention, there are no encoding/puncturing limitations of LDPC code for any MCS. By enabling the use of all the MCS rates available, the peak PHY rate may be achieved and improvement in link adaptation may be effectuated.

FIG. 14 illustrates an embodiment of modulation coding set (MCS) tables for binary convolutional code (BCC) for 20 MHz operation. This diagram shows all of the MCS rates for use in communications operating in accordance with 20 MHz operation. The top two rows show MCS rates that are operative to effectuate the peak PHY rate for this mode of operation.

FIG. 15 illustrates an embodiment of MCS tables for BCC for 80 MHz operation. This diagram shows all of the MCS rates for use in communications operating in accordance with 80 MHz operation. The top row shows the MCS rate that is operative to effectuate improvement in link adaptation for this mode of operation.

FIG. 16 illustrates an embodiment of MCS tables for BCC for 160 MHz operation. This diagram shows all of the MCS rates for use in communications operating in accordance with 160 MHz operation. The top row shows the MCS rate that is operative to effectuate the peak PHY rate for this mode of operation.

FIG. 17 illustrates an embodiment of MCS rates corresponding to peak PHY rate for 20 MHz and 160 MHz operation. The MCS rates depicted in this diagram correspond to the peak PHY rate for the respective modes of operation, namely, 20 MHz and 160 MHz operation. These MCS rates ensure that one-third of the effectiveness of 256 QAM will not be lost, so that a 33% peak throughput gain is achieved by adding support of 256 QAM. By excluding mcs9, only 20% throughput gain can be achieved by upgrading from 64 QAM to 256 QAM.

FIG. 18 illustrates an embodiment of an MCS suitable to improved link adaptation. As mentioned elsewhere herein, MCS rates that are important for link adaptation are included herein. The MCS rate depicted in this diagram corresponds to an MCS rate selected for improved link adaptation. The inclusion of these MCS rates is operative to ensure that link adaptation does not deleteriously suffer from "too coarse" MCS levels. For example, an MCS rates particularly suited for link adaptation may be a peak rate for some devices.

As may be seen in accordance with various aspects and principles, and their equivalents, of the invention, an MCS table has been presented herein for LDPC (Low Density Parity Check) such that all MCS rates are supported for LDPC.

LDPC does not have any limitation regarding encoding/puncturing as BCC. Also, the same MCS table is not necessarily employed for both BCC and LDPC to effectuate communications in accordance with certain various standards, protocols, and/or recommended practices (e.g., and particularly in accordance with certain proposals for use in IEEE 802.11ac in one embodiment), and as such, certain MCS rates are excluded for LDPC usage.

In accordance with various aspects and principles, and their equivalents, of the invention, all MCS rates with LDPC may be employed (e.g., such as in accordance with a proprietary operational mode) to assist in effectuating any of the various benefits and/or reasons as presented herein.

Moreover, a novel approach is made herein in regards to dealing with the issue of non-integer Ndbps, which is the number of data bits per OFDM symbol. For the LDPC Physical Layer Convergence Procedure (PLCP) Protocol Data Unit (PPDU) and encoding process, a parameter Ndbps is employed.

$$Ndbps = Ncbps \times R, \text{ where:}$$

R is the coding rate;
Ncbps is the number of coded bits per OFDM symbol; and
Ndbps is the number of data bits per OFDM symbol.

For these additionally included MCS rates, Ndbps may sometimes become fractional. In such an instance, any fractional discrepancy may be resolved as follows:

$$Ndbps = \text{floor}(Ncbps \times R)$$

The floor function is operative to map a real number (e.g., a fraction) to the largest integer not greater than the value of the function itself.

In the instant case (e.g., floor function), Ndbps is then the largest integer not greater than the term 'Ncbps×R'.

In other embodiments, alternative functions may be employed for dealing with situations in which Ndbps may become fractional (e.g., in accordance with these additionally included MCS rates), any fractional discrepancy may alternatively be resolved using any other desired function to arrive at an integer number of data bits per OFDM symbol, Ndbps. For example, at least two other functions for arriving at such a function of an integral number of data bits per OFDM symbol, Ndbps, as being an integer number include employing a ceiling function or a rounding function.

For example, a ceiling function is operative to map a real number (e.g., a fraction) to the smallest integer not greater than the value of the function itself. Considering a situation in which these additionally included MCS rates, Ndbps may sometimes become fractional, and such a fractional discrepancy may be alternatively resolved as follows:

$$Ndbps = \text{ceiling}(Ncbps \times R)$$

In such a case (e.g., ceiling function), Ndbps is then the smallest integer that is greater than the term 'Ncbps×R'.

Alternative, with respect to employing some form of a rounding function, the number of data bits per OFDM symbol, Ndbps, may be modified to be an integer number in accordance with any of a number of various operations including, replacing the value of Ndbps with a lower or higher integer value (e.g., rounding up or rounding down to the next integer value), replacing the value of Ndbps with a lower or higher integer value that is a multiple of some other specified number or amount (e.g., rounding up or rounding down to the next integer value that is a multiple of some other specified number or amount [such as a predetermined number, a number selected from a group or set of predetermined numbers]), etc.

Generally speaking, any desired operations that result in a number of data bits per OFDM symbol, Ndbps, as being an integer number may be employed.

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can perform such operations and/or any other operations and functions as described herein, etc. or their respective equivalents.

Figure 19:
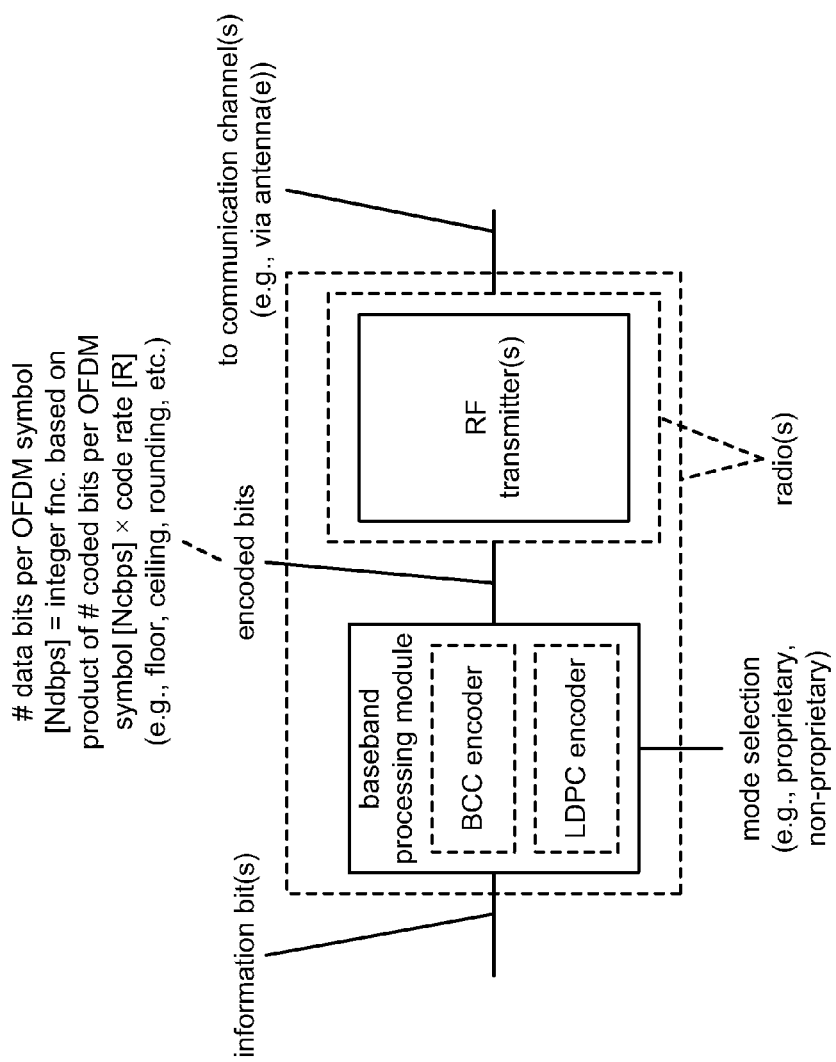
FIG. 19 illustrates an embodiment of at least a portion of a communication device.

FIG. 19 illustrates an embodiment 1900 of at least a portion of a communication device. As can be seen within this diagram, a baseband processing module is operative to generate one or more signals that may subsequently be provided to at least one radio frequency (RF) transmitters. Within the one or more RF transmitters, the one or more signals provided from the baseband processing module may undergo any appropriate processing including any one or more of digital to analog conversion, filtering, gain adjustment and/or scaling, frequency shifting, etc. in order to generate a signal within a suitable form for being launched into or transmitted via one or more communication channels. As may also be understood with respect to various prior diagrams and/or embodiments, such as those with respect to FIG. 2, a given communication device may include one or more RF transmitters, one or more corresponding antennae, and may operates transmit respective communication signals via one or more communication channels (e.g., such as via one or more pathways from one or more of the antennae).

While it is noted that a given architecture of the communication device may include multiple signals being output from such a baseband processing module, multiple RF transmitters, multiple antenna, etc., certain descriptions with respect to this diagram are presented with respect to one of such given communication pathways for ease of illustration. For example, one or more information bits may be provided to the baseband processing module implemented to perform encoding in accordance with a selected error correction code (ECC) thereby generating encoded bits. A variety of him and him and him different types of encodings may be employed including systematic codes (e.g., in which the one or more information bits are explicitly included within a signal output from the baseband processing module) and/or non-systematic codes (e.g., in which the one or more information bits are not explicitly included with the signal output from the baseband processing module). At least two different types of ECCs by which encoded bits may be generated within the baseband processing module include those of a low density parity check (LDPC) and a binary convolutional code (BCC). The baseband processing module may itself be implemented to perform any selected encoding in accordance with a selected ECC. For example, the baseband processing module may be implemented to perform LDPC encoding, BCC coding, etc. Alternatively, the baseband processing module may include one or more different respective modules, circuitries, etc. therein for performing such selective encoding in accordance with different ECCs. For example, the baseband processing module may be implemented to include a BCC encoder, and LDPC encoder, etc. such that each different respective and implemented encoder therein is operative to perform encoding in accordance with a corresponding ECC.

In some embodiments, the baseband processing module itself performs mode selection in which ECC encoding is performed in accordance with a selected ECC. For example, the baseband processing module may select operation in accordance with BCC encoding at or during a first time, in accordance with LDPC coding at or during a second time, etc. In other embodiments, a mode selection signal may be provided from outside of the baseband processing module to direct the operation thereof. For example, a mode selection signal provided to the baseband processing module may direct its operation in accordance with a selected ECC (e.g., such as in accordance with BCC, LDPC, etc.). Moreover, such mode selection may be employed to select an operational mode of the baseband processing module in accordance with a non-proprietary mode of operation are proprietary mode of operation. Operation in accordance with a non-proprietary mode of operation may correspond to that which is in compliance with a given protocol, standard, and/or recommended practice. Operation in accordance with the proprietary mode of operation may correspond to that which is includes additional functionality and/or capability which may be beyond that given protocol, standard, and/or recommended practice. For example, in one embodiment, operation in accordance with a non-proprietary mode of operation may include functionality and/or capability which is fully in accordance with that associated with IEEE 802.11ac, while operation in accordance with a proprietary mode of operation may include functionality and/or capability which is beyond that associated with IEEE 802.11ac. Generally speaking, various embodiments may implement non-proprietary/proprietary modes of operation, and the selective operation thereof, and a variety of ways, including the baseband processing module selecting between such operational modes itself, the baseband processing module being directed (e.g., such as from a mode selection signal provided thereto) to operate within such operational modes, etc.

The baseband processing module is then operative to provide a signal that includes a number of encoded bits in a particular format such that the number of data bits per OFDM symbol is based on a product term function corresponding to a number of coded bits per OFDM symbol multiplied by a coding rate of the corresponding ECC employed to generate those encoded bits. As described elsewhere herein, such a product term function may be any desired function that results in an integer number of data bits per OFDM symbol (e.g., a floor product term product term function, ceiling function, a rounding product term function, etc.). For example, when the resulting product term generated by the number of coded bits per OFDM symbol multiplied by the coding rate the corresponding ECC results in a non-integer value (e.g., resulting in a non-integer value for the number of data bits per OFDM symbol, such as a fractional value), then that non-integer value may be appropriately modified thereby generating an integer value for the number of data bits per OFDM symbol within a signal generated by the baseband processing module.

This signal, having the appropriately formed integer number of data bits per OFDM symbol, is then transmitted via at least one communication channel to at least one additional communication device. Again, various embodiments may include transmitting multiple respective signals via multiple respective communication channels to more than one other communication device. It is also noted that the one or more RF transmitters may be included within a common radio as the baseband processing module. Alternatively, the one or more RF transmitters may be included within a radio that is separately implemented with respect to the baseband processing module. For example, such as considering the diagram of FIG. 2, a processing module 50 (e.g., which may itself be a baseband processing module, such as implemented within a host device) maybe implemented separately from the baseband processing module 64 within the radio 60. The appropriately generated signal, having the appropriately formed integer number of data bits per OFDM symbol, may be generated within either of such different baseband processing modules, or in combination among both of them. Generally speaking, various architectures of baseband processing modules, including a singularly implemented baseband processing module or one having a distributed type architecture with multiple baseband processing modules operating cooperatively and in concert with one another, may be employed to generate the signal having the appropriately formed integer number of data bits per OFDM symbol.

Regardless of the particular implementation by which such a signal is generated, the signal may be transmitted using one or more radios to one or more other communication devices via one or more communication channels. For example, in one embodiment, a singular signal is transmitted using one radio to one other communication device. In another embodiment, a given signal is transmitted using at least one radio to multiple other communication devices. Of course, other embodiments may include transmitting multiple respective signals using multiple respective radios to multiple other communication devices.

Also, it is also noted that the generation of such a signal, having the appropriately formed integer number of data bits per OFDM symbol, may be generated in accordance with a proprietary mode of operation that is augmented capability and/or functionality beyond a given protocol, standard, and/or recommended practice (e.g., IEEE 802.11ac). For example, such a nonproprietary mode of operation may provide for use in accordance with one or more MCSs that are not particularly included within such a given protocol, standard, and/or recommended practice (e.g., IEEE 802.11ac). By including such additional MCSs, a number of different benefits may be achieved including improved link adaptation and peak PHY rate.

FIG. 20A, FIG. 20B, FIG. 21A, FIG. 21B, and FIG. 21C illustrate various embodiments of methods for operating a communication device.

Referring to the method 2000 of FIG. 20A, the method 2000 begins by generating the signal including an integer number of data bits per OFDM symbol based on a product term function corresponding to a number of coded bits per OFDM symbol, as shown in a block 2010. The determination of this integer number of data bits per OFDM symbol may be performed in a variety of ways, including using a floor product term function, a ceiling product term function, a rounding product term function, etc.

The method 2000 and then continues by transmitting the signal to at least one additional communication device, as shown in a block 2020. It is noted that the signal may undergo any of a variety of operations to ensure that it is compliant with and suitable for transmission via a given communication channel Different operations may include digital to analog conversion, filtering, gain adjustment and/or scaling, frequency shifting, etc.

Referring to method 2001 of FIG. 20B, the method 2001 begins by performing BCC encoding of at least one information that thereby generating the signal including an integer number of data bits per OFDM symbol based on a product term function corresponding to a number of coded bits per OFDM symbol, as shown in a block 2011. Somewhat analogous to other embodiments, the determination of such an integer number of data bits per OFDM symbol may be performed in a variety of ways, including using a floor product term function, a ceiling product term function, a rounding product term function, etc.

The method 2001 and then continues by transmitting the signal to at least one additional communication device, as shown in a block 2021. Somewhat analogous to other embodiments, it is noted that the signal may undergo any of a variety of operations to ensure that it is compliant with and suitable for transmission via a given communication channel. Different operations may include digital to analog conversion, filtering, gain adjustment and/or scaling, frequency shifting, etc.

Referring to method 2100 of FIG. 21A, the method 2100 begins by performing LDPC encoding of at least one information that thereby generating the signal including an integer number of data bits per OFDM symbol based on a product term function corresponding to a number of coded bits per OFDM symbol, as shown in a block 2110. Somewhat analogous to other embodiments, the determination of such an integer number of data bits per OFDM symbol may be performed in a variety of ways, including using a floor product term function, a ceiling product term function, a rounding product term function, etc.

The method 2100 and then continues by transmitting the signal to at least one additional communication device, as shown in a block 2120. Somewhat analogous to other embodiments, it is noted that the signal may undergo any of a variety of operations to ensure that it is compliant with and suitable for transmission via a given communication channel. Different operations may include digital to analog conversion, filtering, gain adjustment and/or scaling, frequency shifting, etc.

Referring to method 2101 of FIG. 21B, the method 2101 begins by generating a signal having a modulation of 256 QAM and a code rate of 5/6, as shown in a block 2111. The method 2101 then operates by transmitting the signal to at least one additional communication device using a channel bandwidth of 20 MHz or hundred 60 MHz, as shown in a block 2121.

Referring to method 2102 of FIG. 21C, the method 2102 begins by generating the signal having a modulation of 64 QAM and a code rate of ¾, as shown in a block 2112. The method 2102 then operates by transmitting the signal to at least one additional communication device using a channel bandwidth of 80 MHz, as shown in a block 2122.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| | | 2.4 GHz, 20/22 MHz channel BW, 54 Mbps max bit rate | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |

TABLE 1-continued 2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a baseband processing module configured to:
process first information bits using a first modulation coding set (MCS) to generate a first orthogonal frequency division multiplexing (OFDM) symbol, wherein the first MCS is selected from a wireless communication protocol that includes a plurality of MCSs; and
process second information bits using a second MCS that is excluded from the wireless communication protocol to generate a second OFDM symbol, wherein the second MCS is based on an integer number of data bits that is a product of a number of coded bits per OFDM symbol multiplied by a coding rate when the product is an integer value and that is based on a rounding product term function of the product when the product is a non-integer integer value, wherein the second MCS includes a modulation of 256 quadrature amplitude modulation (QAM) and a code rate of 5/6 or a modulation of 64 QAM and a code rate of 3/4; and
a radio configured to transmit the first and second OFDM symbols to at least one additional wireless communication device.

2. The wireless communication device of claim 1 further comprising:
the baseband processing module configured to process the second information bits using the second MCS to generate the second OFDM symbol based on the rounding product term function being a floor product term function when the product is the non-integer integer value.

3. The wireless communication device of claim 1 further comprising:
the baseband processing module configured to process the second information bits using the second MCS to generate the second OFDM symbol based on the rounding product term function being a ceiling product term function when the product is the non-integer integer value.

4. The wireless communication device of claim 1, wherein the wireless communication protocol is an IEEE 802.11 wireless communication protocol; and further comprising:
the baseband processing module configured to:
process the first information bits using a first MCS to generate the first OFDM symbol operating within a first operational mode that is compliant with the IEEE 802.11 wireless communication protocol; and
process the second information bits using the second MCS to generate the second OFDM symbol when operating within a second operational mode that is proprietary and excluded from the IEEE 802.11 wireless communication protocol.

5. The wireless communication device of claim 1 further comprising:
the radio configured to transmit at least one of the first and second OFDM symbol using a channel bandwidth of 20 MHz or 160 MHz when the second MCS includes the modulation of 256 QAM and the code rate of 5/6; and
the radio configured to transmit at least one of the first and second OFDM symbol using a channel bandwidth of 80 MHz when the second MCS includes the modulation of 64 QAM and the code rate of 3/4.

6. The wireless communication device of claim 1 further comprising:
an access point (AP) or a wireless station (STA), wherein the at least one additional wireless communication device is at least one additional AP or at least one additional STA.

7. A wireless communication device comprising:
a baseband processing module configured to:
process first information bits using a first modulation coding set (MCS) to generate a first orthogonal frequency division multiplexing (OFDM) symbol when operating within a first operational mode that is compliant with an IEEE 802.11 wireless communication protocol that includes a plurality of MCSs including the first MCS; and
process second information bits using a second MCS to generate a second OFDM symbol when operating within a second operational mode that is proprietary and excluded from the IEEE 802.11 wireless communication protocol, wherein the second MCS is based on an integer number of data bits that is a product of a number of coded bits per OFDM symbol multiplied by a coding rate when the product is an integer value and that is based on a rounding product term function of the product when the product is a non-integer integer value; and
a radio configured to transmit the first and second OFDM symbols to at least one additional wireless communication device.

8. The wireless communication device of claim 7 further comprising:
at least one of an low density parity check (LDPC) encoder configured to encode at least one information bit to generate LDPC coded bits and a binary convolutional code (BCC) encoder configured to encode the at least one information bit to generate a BCC coded bits, wherein at least one of the first and second OFDM symbols is based on at least one of the LDPC coded bits and the BCC coded bits.

9. The wireless communication device of claim 7 further comprising:
the baseband processing module configured to perform at least one of low density parity check (LDPC) encoding of at least one information bit to generate LDPC coded signal bits and binary convolutional code (BCC) encoding to encode the at least one information bit to generate a BCC coded bits, wherein at least one of the first and second OFDM symbols is based on at least one of the LDPC coded bits and the BCC coded bits.

10. The wireless communication device of claim 7, wherein the second MCS includes a PHY rate that is relatively greater than a PHY rate of the first MCS of the IEEE 802.11 wireless communication protocol and relatively lower than a PHY rate of another MCS of the IEEE 802.11 wireless communication protocol.

11. The wireless communication device of claim 7, wherein:
the second MCS includes a modulation of 256 quadrature amplitude modulation (QAM) and a code rate of 5/6 or a modulation of 64 QAM and a code rate of 3/4; and further comprising:
the radio configured to transmit at least one of the first and second OFDM symbol using a channel bandwidth of 20 MHz or 160 MHz when the second MCS includes the modulation of 256 QAM and the code rate of 5/6; and
the radio configured to transmit at least one of the first and second OFDM symbol using a channel bandwidth of 80 MHz when the second MCS includes the modulation of 64 QAM and the code rate of 3/4.

12. The wireless communication device of claim 7, further comprising:
the baseband processing module configured to process the second information bits using the second MCS to generate the second OFDM symbol based on the rounding product term function being a floor product term function when the product is the non-integer integer value.

13. The wireless communication device of claim 7 further comprising:
the baseband processing module configured to process the second information bits using the second MCS to generate the second OFDM symbol based on the rounding product term function being a ceiling product term function when the product is the non-integer integer value.

14. The wireless communication device of claim 7, wherein the second MCS includes a PHY rate that is relatively lower than each MCS of the plurality of MCSs of the IEEE 802.11 wireless communication protocol.

15. The wireless communication device of claim 7 further comprising:
the baseband processing module configured to process third information bits using a third MCS to generate a third OFDM symbol when operating within a third operational mode that is also proprietary and excluded from the IEEE 802.11 wireless communication protocol, wherein the third MCS is based on another integer number of data bits that is selected from a predetermined group or set of integer multiples of data bits when the product is a non-integer integer value.

16. The wireless communication device of claim 7 further comprising:
an access point (AP) or a wireless station (STA), wherein the at least one additional wireless communication device is at least one additional AP or at least one additional STA.

17. A method execution by a wireless communication device, comprising:
processing first information bits using a first modulation coding set (MCS) to generate a first orthogonal frequency division multiplexing (OFDM) symbol when operating within a first operational mode that is compliant with an IEEE 802.11 wireless communication protocol that includes a plurality of MCSs including the first MCS;
processing second information bits using a second MCS to generate a second OFDM symbol when operating within a second operational mode that is proprietary and excluded from the IEEE 802.11 wireless communication protocol, wherein the second MCS is based on an integer number of data bits that is a product of a number of coded bits per OFDM symbol multiplied by a coding rate when the product is an integer value and that is based on a rounding product term function of the product when the product is a non-integer integer value; and
operating a radio of the communication device to transmit the first and second OFDM symbols to at least one additional wireless communication device.

18. The method of claim 17, wherein the second MCS includes a modulation of 256 quadrature amplitude modulation (QAM) and a code rate of 5/6 or a modulation of 64 QAM and a code rate of 3/4; and further comprising:
operating the radio to transmit at least one of the first and second OFDM symbols using a channel bandwidth of 20 MHz or 160 MHz when the second MCS includes the modulation of 256 QAM and the code rate of 5/6; and
operating the radio to transmit at least one of the first and second OFDM symbols using a channel bandwidth of 80 MHz when the second MCS includes the modulation of 64 QAM and the code rate of 3/4.

19. The method of claim 17 further comprising:
processing the second information bits using the second MCS to generate the second OFDM symbol based on the rounding product term function being a floor product term function when the product is the non-integer integer value.

20. The method of claim 17 further comprising:
processing the second information bits using the second MCS to generate the second OFDM symbol based on the rounding product term function being a ceiling product term function when the product is the non-integer integer value.

* * * * *